Feb. 11, 1930.                I. C. JENNINGS                1,746,428
                          SEWAGE EJECTING SYSTEM
                           Filed March 25, 1925         3 Sheets-Sheet 1

Inventor
*Irving C. Jennings*

By *Southgate Fay & Hawley*
Attorneys

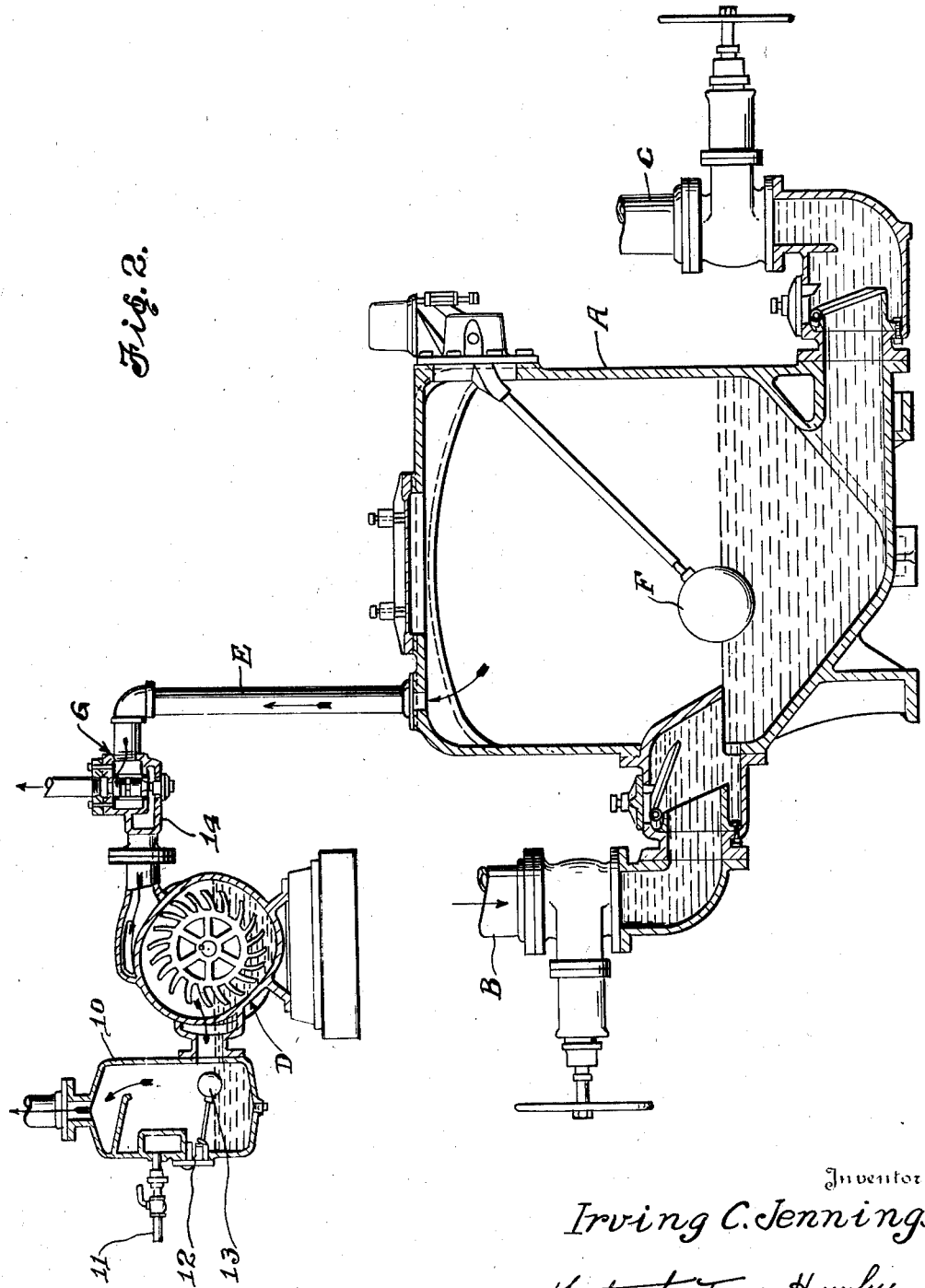

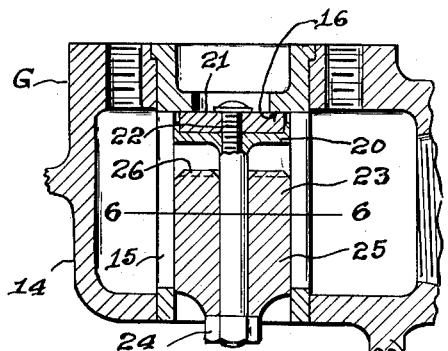
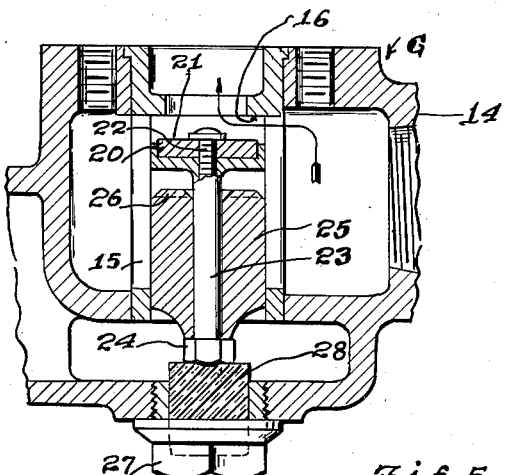
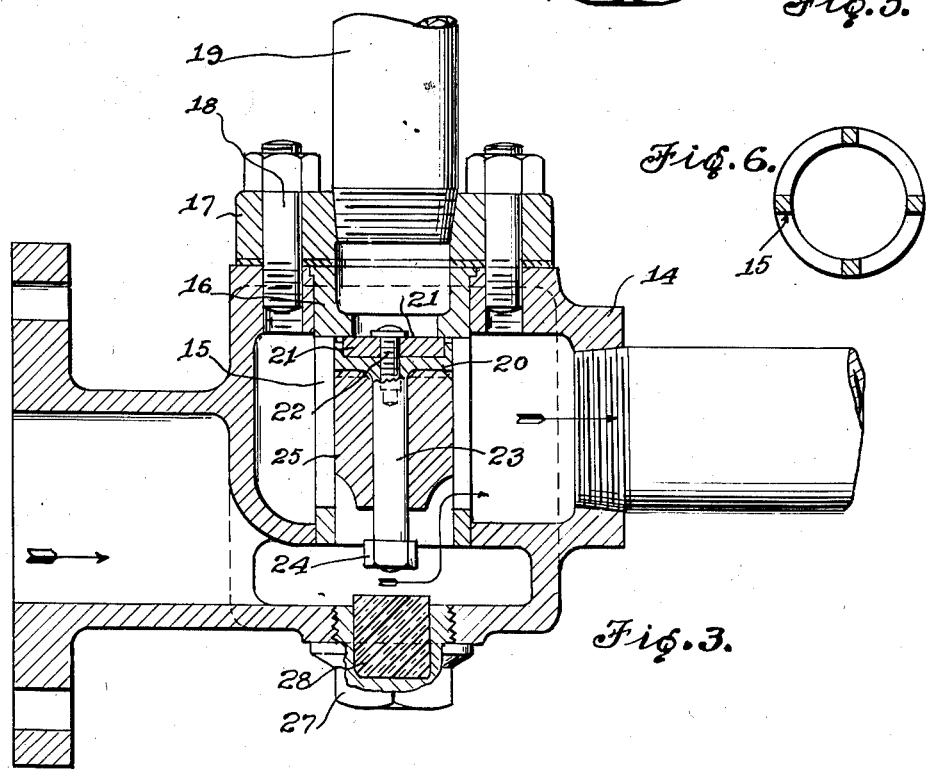
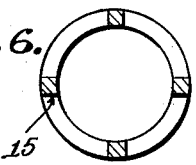
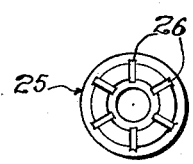

Patented Feb. 11, 1930

1,746,428

UNITED STATES PATENT OFFICE

IRVING C. JENNINGS, OF SOUTH NORWALK, CONNECTICUT

SEWAGE-EJECTING SYSTEM

Application filed March 25, 1925. Serial No. 18,276.

The object of this invention is to improve the apparatus shown, described, and claimed in Letters Patent granted to me April 29, 1924, No. 1,492,171.

In this patent, I have shown a sewage ejector of the air compressor type, in which the air under pressure is supplied by a rotary hydro-turbine air pump and through which pump the air vents when the pump is cut out of operation.

I have encountered difficulty in some locations in using the hydro-turbine air pump to compress the air and in allowing the air to vent through the pump, by reason of the fact that it is necessary to provide a water supply for the hydro-turbine pump so that it will always be in condition to operate.

The means I preferably employ for supplying the hydro-turbine pump with priming water consists of a small supply tank or receptacle to which city water or other supply is connected, and in which a level just above the inlet to the pump is maintained by a float controlled valve. If this valve should leak there might be too much water in this supply tank, which, in some cases where the drains to the sewage ejector are almost at a level with the same, would choke the back flow of air through the pump.

Another difficulty encountered was that when the water or sewage flowed into the ejector at a rapid rate, the air would flow back through the air pump so fast that when the pump was started in operation, the same was unable to get priming water quickly and unable to start into operation immediately. Under these conditions the pump might run for fifteen or twenty seconds or longer before it would start to compress the air, during which time the ejector would partly fill, which would increase the time required to discharge the sewage from the ejector, and thus reduce its capacity.

The object of the present invention is to overcome these difficulties and keep the air pump properly primed.

The invention is illustrated in the accompanying three sheets of drawings, in which Figure 1 is a sectional diagrammatic elevation of the apparatus showing the same in operation ejecting the sewage;

Fig. 2 is a similar view showing the pump out of operation and the compressed air escaping from the ejector;

Fig. 3 is an enlarged sectional elevation of the vent valve;

Fig. 4 is a partial sectional elevation illustrating the valve in closed position;

Fig. 5 is a sectional elevational illustrating the valve in open position allowing the venting of the ejector;

Fig. 6 is a cross sectional plan on the line 6—6 of Fig. 4, illustrating a part of the valve; and Fig. 7 is a plan view of the operating piston of the valve.

Figure 1:
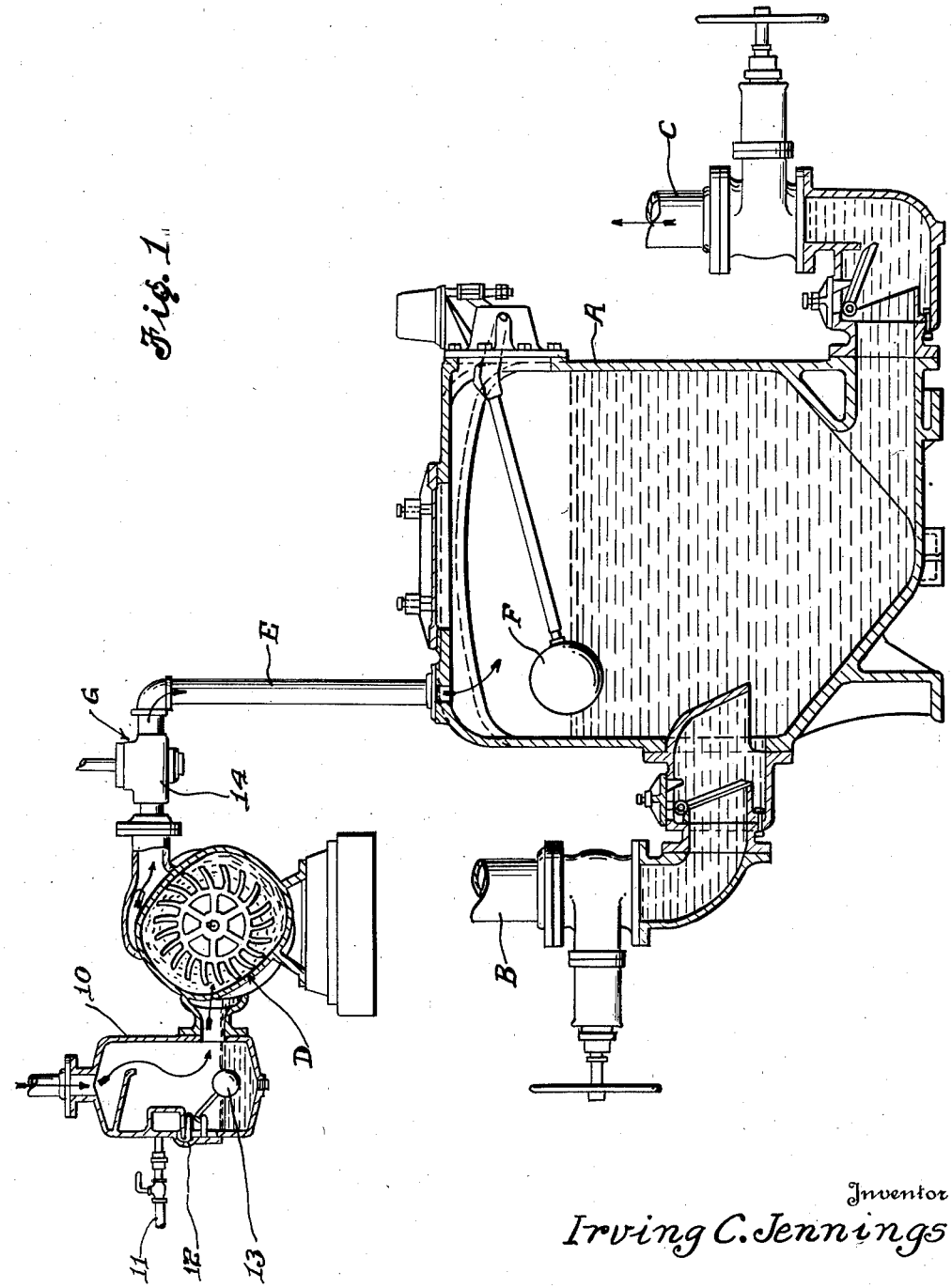

Referring to the drawings and in detail, A designates the ejector or pot to which the sewage is led by an inlet pipe B, having a forwardly opening check valve, and from which the sewage is forced through an outlet pipe C also having a forwardly opening check valve. D designates the hydro-turbine air compressor, the outlet of which is connected by pipe E to the ejector A. A float F is arranged in the ejector and operates a switch which controls the operation of an electric motor driving the pump. These parts are arranged substantially as described in my prior patent and operate briefly as follows:

When the sewage reaches a high level in the ejector, the float will throw the switch so that the motor will start the pump in operation. The pump will force air into the top of the ejector and the sewage will be forced therefrom as illustrated in Fig. 1. When the level of the sewage falls to a low determined point, the float operates the switch to stop the motor and throw the pump out of operation.

When the pump stops, the compressed air will flow out through the pipe E, and when the air pressure is relieved, the sewage will flow into the pot, as illustrated in Fig. 2, until the high level is reached, when the operation will be repeated.

It is necessary to provide the pump with priming water so that it will always be ready to operate. To do this, I arrange a priming or surge tank 10 on the pump inlet to which a supply of water 11 is connected and led into the tank through a valve 12 controlled by a float 13. These parts are arranged so that the normal level of the water in the tank 10 will be just above the level of the pump inlet so that the pump always will have the proper amount of make-up or operating water.

The small surplus of water that passes over to the pump from this source is fed along into the ejector and passes out with the sewage.

To provide for the venting of the ejector, I arrange a vent valve G in the pipe E. This vent valve has a suitable casing 14. A bushing or cylindrical shell 15 having slots extending partways of its length has a valve seat 16 at its top. A plate 17 is attached to the casing 14 by screws 18 and holds these parts in position.

A vent pipe 19 is connected to this plate 17. This pipe 19 may connect to the air inlet of the pump or separately to the atmosphere or to the place where it is desired to vent the air.

Sliding inside of the cylindrical shell 15 is a valve 20, which has a rubber or bearing face 21, which can seat on the valve seat 16, the bearing face 21 being held to the valve by screw 22. The valve 20 has a depending stem 23, a bolt-head or collar 24 being formed on the lower end thereof.

A piston 25 is loosely fitted on the stem 23. This piston may have small slots or grooves 26 in its upper face, as illustrated in Fig. 7, so that it will not stick to the lower side of the valve 20. The valve 20 and the piston 25 preferably are made out of non-oxidizable metal. A cap 27 is threaded in the bottom part of the casing and contains a rubber or soft material cushion 28 against which the head 24 can strike.

When the pump is in operation and air is being forced into the ejector or pot A, as shown in Fig. 1, the pressure of the air on the underside of the piston 25 and the valve 20 will lift these parts to the position shown in Fig. 3 and flow to the vent pipe 19 will thus be prevented and the air compressed in the pump will pass directly over to the pot or ejector A.

When the pump is cut out of operation the flow of air through the vent valve stops and the piston 25 drops to the position shown in Fig. 4, closing the passage between the compressor and the sewage ejector. The air in the compressor is relieved of pressure by the water falling to the bottom of the casing, allowing the inlet and outlet ports to connect to the atmosphere. This relieves the bottom of piston 25 of pressure, and the pressure in the sewage ejector pot is communicated directly on top of this piston, which has a greater area than the bearing face 21 of the valve 22. This causes the piston 25, carrying with it valve 22, to drop to the position shown in Fig. 2 and Fig. 5, whereby the air in the pot can escape out through the vent pipe 19.

It will also be seen that when the flow of air into the pot ceases by the stopping of the pump and the piston 25 drops down on the stem 23 of the valve 22, it will strike on the head 24 and this will jar and help release the valve from the valve seat 16. This action will neutralize any tendency of the bearing face 21 to stick and will ensure operation of the vent valve at all times.

When the pump starts again in operation, the pressure of the air acting underneath the piston 25 and the valve 20 will restore the parts to the position shown in Figs. 1 and 3.

The before described operation of this vent valve will take place easily, because the hydro-turbine pump itself vents to the air when it stops and when the back flow of air starts the vent valve will operate immediately.

The use of the piston in combination with the valve makes a vent valve which will operate efficiently in the location shown and by using the same the priming of the hydro-turbine air pump will not interfere with the operation.

The details of the air vent valve herein shown and described are claimed by me in a divisional application for patent filed pursuant to a requirement of the Patent Office November 25, 1927, Serial No. 235,629.

The details herein shown and described may be greatly varied by a skilled mechanic without departing from the scope of my invention as expressed in the claims.

Having thus described my invention, what I desire to claim and secure by Letters Patent, is:

1. In a sewage ejecting system, the combination of an ejector, a hydro-tubine air pump connected thereto, a vent valve in this connection constructed to close the vent and connect the pump and the ejector when the pump starts in operation and to cut off communication between the ejector and pump and allow the air in the ejector to vent or escape when the pump stops operation.

2. In a sewage ejecting system, the combination of an ejector, a hydro-turbine air pump connected thereto, means for supplying the pump with make up water, a vent valve in said connection constructed to close the vent and connect the pump and the ejector when the pump starts in operation and to cut off communication between the ejector and pump and allow the air in the ejector to vent or escape when the pump stops operation.

3. In a sewage ejecting system, the combination of an ejector, a hydro-turbine air pump connected thereto, a tank and float valve for supplying the hydro-turbine pump with priming water, and a vent valve in said connection constructed to close the vent and connect the pump and the ejector when the pump starts in operation and to cut off communication between the ejector and pump and allow the air in the ejector to vent or escape when the pump stops operation.

4. In a sewage ejecting system, the combination of an ejector, a hydro-turbine air pump connected thereto through which pump air can vent when it is stopped, a vent valve in the connection between the air pump and the ejector constructed to close the vent and connect the pump and the ejector when the pump starts in operation and to cut off communication between the ejector and pump and allow the air in the ejector to vent or escape when the pump stops operation and the air starts to flow back through the pump.

In testimony whereof I have hereunto affixed my signature.

IRVING C. JENNINGS.